(12) United States Patent
Ableitner

(10) Patent No.: US 7,708,442 B2
(45) Date of Patent: May 4, 2010

(54) LIGHT EMITTING PANELS FOR DISPLAY DEVICES

(75) Inventor: Jason L. Ableitner, Edina, MN (US)

(73) Assignee: Honeywell International Inc., Morristown, NJ (US)

(*) Notice: Subject to any disclaimer, the term of this patent is extended or adjusted under 35 U.S.C. 154(b) by 752 days.

(21) Appl. No.: 11/552,562

(22) Filed: Oct. 25, 2006

(65) Prior Publication Data

US 2008/0100771 A1    May 1, 2008

(51) Int. Cl.
    *F21V 7/04* (2006.01)
(52) U.S. Cl. ............... 362/611; 362/600; 362/606; 362/607; 362/608; 362/610; 362/612
(58) Field of Classification Search .......... 345/1.1, 345/33, 38, 39, 55, 76, 82, 84, 87, 102, 156; 362/23, 26, 27, 29, 600, 606, 607, 608, 610, 362/611, 612, 623, 624, 625, 632, 633, 634
See application file for complete search history.

(56) References Cited

U.S. PATENT DOCUMENTS

| | | | |
|---|---|---|---|
| 4,254,453 A * | 3/1981 | Mouyard et al. ............ 362/240 |
| 4,714,983 A | 12/1987 | Lang | |
| 5,327,328 A | 7/1994 | Simms et al. | |
| 5,613,751 A | 3/1997 | Parker et al. | |
| 5,618,096 A | 4/1997 | Parker et al. | |
| 5,803,573 A | 9/1998 | Osawa et al. | |
| 5,876,107 A | 3/1999 | Parker et al. | |
| 5,951,152 A | 9/1999 | Zabawski et al. | |
| 6,045,249 A | 4/2000 | Bellinghausen et al. | |
| 6,079,838 A | 6/2000 | Parker et al. | |
| 6,671,013 B1 | 12/2003 | Ohkawa | |
| 6,848,801 B2 * | 2/2005 | Miyashita .................. 362/611 |
| 7,001,058 B2 | 2/2006 | Inditsky | |
| 7,004,613 B2 | 2/2006 | Sun et al. | |
| 7,186,015 B2 * | 3/2007 | Kimmet et al. ............ 362/630 |
| 2004/0240193 A1 | 12/2004 | Mertz et al. | |
| 2005/0231935 A1 * | 10/2005 | Kimmet et al. .............. 362/29 |

FOREIGN PATENT DOCUMENTS

DE    4125034    2/1993
WO    0050807    8/2000

OTHER PUBLICATIONS

Six (6) Photos of Fluke 87 Multimeter, DCS 186, DCS 188, DCS 189, DCS 192, DCS 193, DCS 194, prior to Oct. 25, 2006.
Five (5) Photos of Honeywell Thermostat, DCS 201, DCS 202, DCS 206, DCS 208, DCS 211, prior to Oct. 25, 2006.

* cited by examiner

*Primary Examiner*—My-Chau T Tran
(74) *Attorney, Agent, or Firm*—Gregory Ansems; Crompton Seager & Tufte LLC

(57) ABSTRACT

Devices and assemblies for providing light to a display panel, including methods of attaching such devices and assemblies to a circuit board, are disclosed. An illustrative device can include a light emitting panel including at least one light interface for receiving light from a light source. The light interface may define an aperture adapted to receive a portion of the light source, forming an air gap between the light source and interface. A number of centering ribs and/or beveled sections can be used to align the light source within the aperture during assembly of the device to a circuit board.

27 Claims, 13 Drawing Sheets

LIGHT EMITTING PANELS FOR DISPLAY DEVICES

FIELD

The present invention relates generally to the field of illumination devices. More specifically, the present invention pertains to light emitting panels and methods for illuminating display devices, including techniques for mounting such panels to a circuit board.

BACKGROUND

Display panels such as liquid crystal displays (LCDs) are commonly used in appliances such as thermostats, watches, pagers, cellular telephones, video cameras, etc. to display information. Such devices typically include a light source and light emitting panel that can be used to generate light across a surface for illuminating the display panel. In some thermostat designs, for example, the light source and light emitting panel may form part of a backlight of the display panel that can be used to facilitate viewing at night or in low-lighting conditions. Typically, the light emitting panel will include a point-type light source such as a light emitting diode (LED) or bulb adapted to direct light into a light guide, which acts as an optical waveguide to distribute the light rays across the surface of the light emitting panel. In some designs, a diffusive pattern of ridges, grooves or dots on the light emitting panel may be used to disperse the light rays in a desired pattern across surface of the light emitting panel for providing a desired lighting characteristic to the display panel.

For some designs, the light generated by the light source may be transmitted through an air gap interface disposed between the light source and the light guide. In such configuration, the uniform distribution of light within the light emitting panel is often dependent on the proper alignment of the light source relative to the light guide as well as the dimensions of the air gap. In some applications, for example, improper alignment of the light source and light guide can cause the light rays directed across the surface of the light emitting panel to be distributed non-uniformly and in a pattern different than the desired pattern. Visually, such inconsistency of light across the surface of the light emitting panel may result in hot spots or streaks on the panel, reducing the brightness and uniformity of the lighting.

BRIEF SUMMARY

The present invention relates generally to the field of light emitting panels and methods for illuminating display devices, including techniques for mounting such panels to a circuit board. An illustrative device for providing backlighting or front-lighting to a display panel can include a light emitting panel having an emitting face, a rear face opposite the emitting face, and an edge. The light emitting panel can include an interface for receiving light from a light source spaced apart and detached from the light emitting panel. An aperture of the light interface can be configured to at least partially surround a portion of the light source therein, and may be dimensioned to correspond generally with the size and shape of the light source. In certain embodiments, for example, the light interface aperture can include a semi-circular notch or groove located on a portion of the light emitting panel having a light receiving surface that corresponds generally to the size and shape of a light emitting surface on the light source. In some embodiments, a number of centering ribs extending inwardly into the interior of the aperture can be provided to align the light source within the aperture to maintain a uniform, non-zero air gap between the light source and light interface. A number of beveled sections can also be provided in some embodiments to further facilitate alignment of the light source within the aperture.

The light emitting panel can be provided as part of a backlight assembly including a display panel, a conductive element, and a display retainer. Attachment of the backlighting assembly to a circuit board can be accomplished by attaching at least one light source to the circuit board, assembling the display panel, conductive element, and light emitting panel together within the display retainer, and then securing the assembled display retainer to the circuit board. The light source can be releasably attached to the circuit board by mounting a plug-in connector to a component side of the circuit board, and then inserting the leads of the light source through several openings on the circuit board and into the plug-in connector with the light source positioned adjacent to the non-component side of the board. During assembly, the centering ribs and/or beveled sections can be configured to facilitate alignment of the light source within the aperture, forming an air gap that prevents uneven distribution of light across the emitting face of the light emitting panel.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized. While the illustrative embodiments are described herein with respect to the backlighting of display panels, it should be understood that the light emitting panel, assemblies, and methods discussed herein can be used to provide lighting for any number of different types of display devices.

Figure 1:
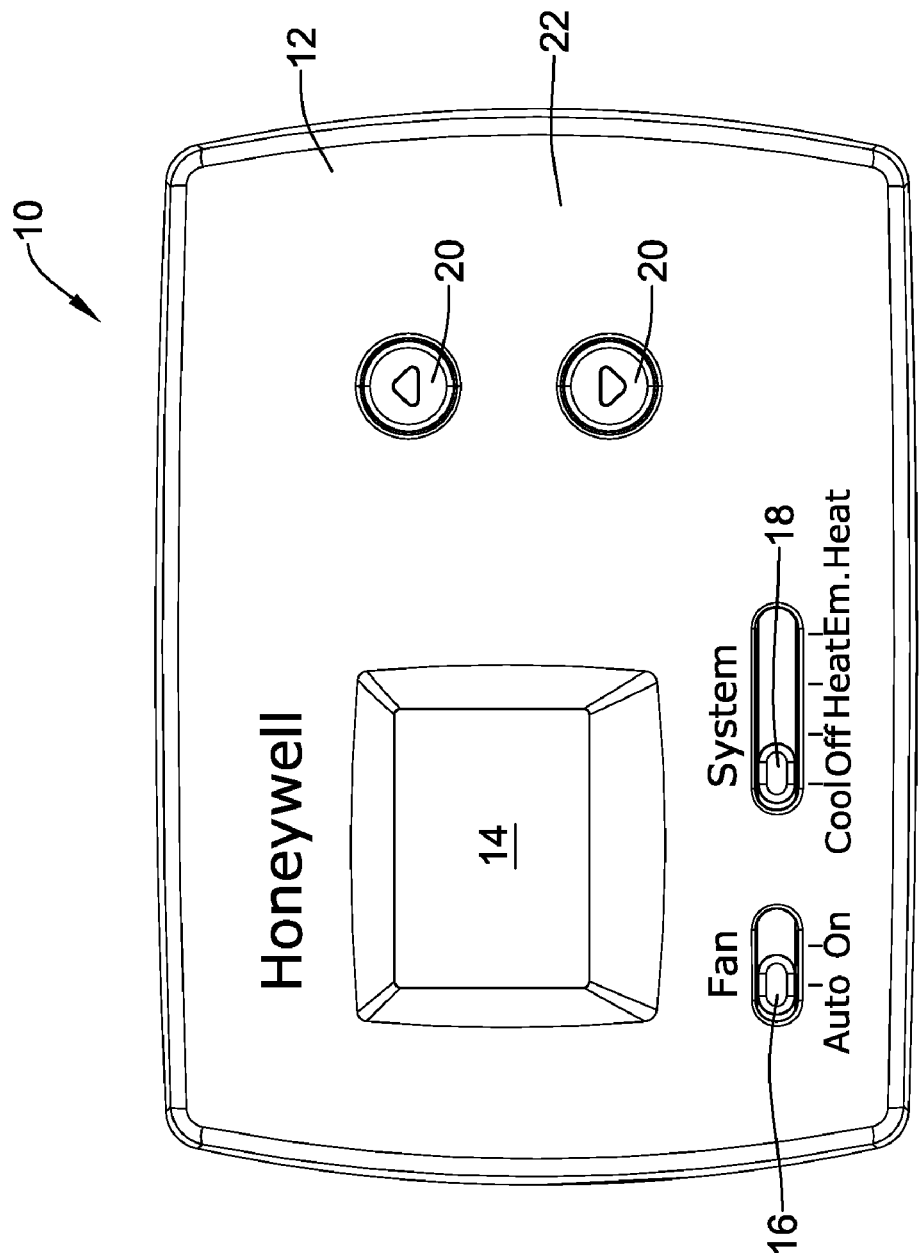
FIG. 1 is a perspective view of a thermostat having a backlit display panel.

FIG. 1 is a perspective view of an appliance 10 employing a backlit display panel 14. Appliance 10, illustratively a wall-mounted thermostat, includes a housing 12 containing display panel 14 and a number of selection buttons 16,18,20 operatively connected to a circuit board disposed within the housing 12. The display panel 14 can include, for example, an LCD panel, dot matrix panel, touchscreen, or other suitable display device. The display panel 14 may be inset within the housing 12 at an angle substantially parallel with the front side 22 of the housing 12, as shown, or can be oriented at a slight angle within the housing 12 to offset the display panel 14 relative to the front side 22. In use, and as discussed in greater detail herein, a separate light emitting panel (not shown) disposed behind the display panel 14 may be provided to form a backlight for illuminating the display panel 14 at night or in low-lighting conditions.

Figure 2:
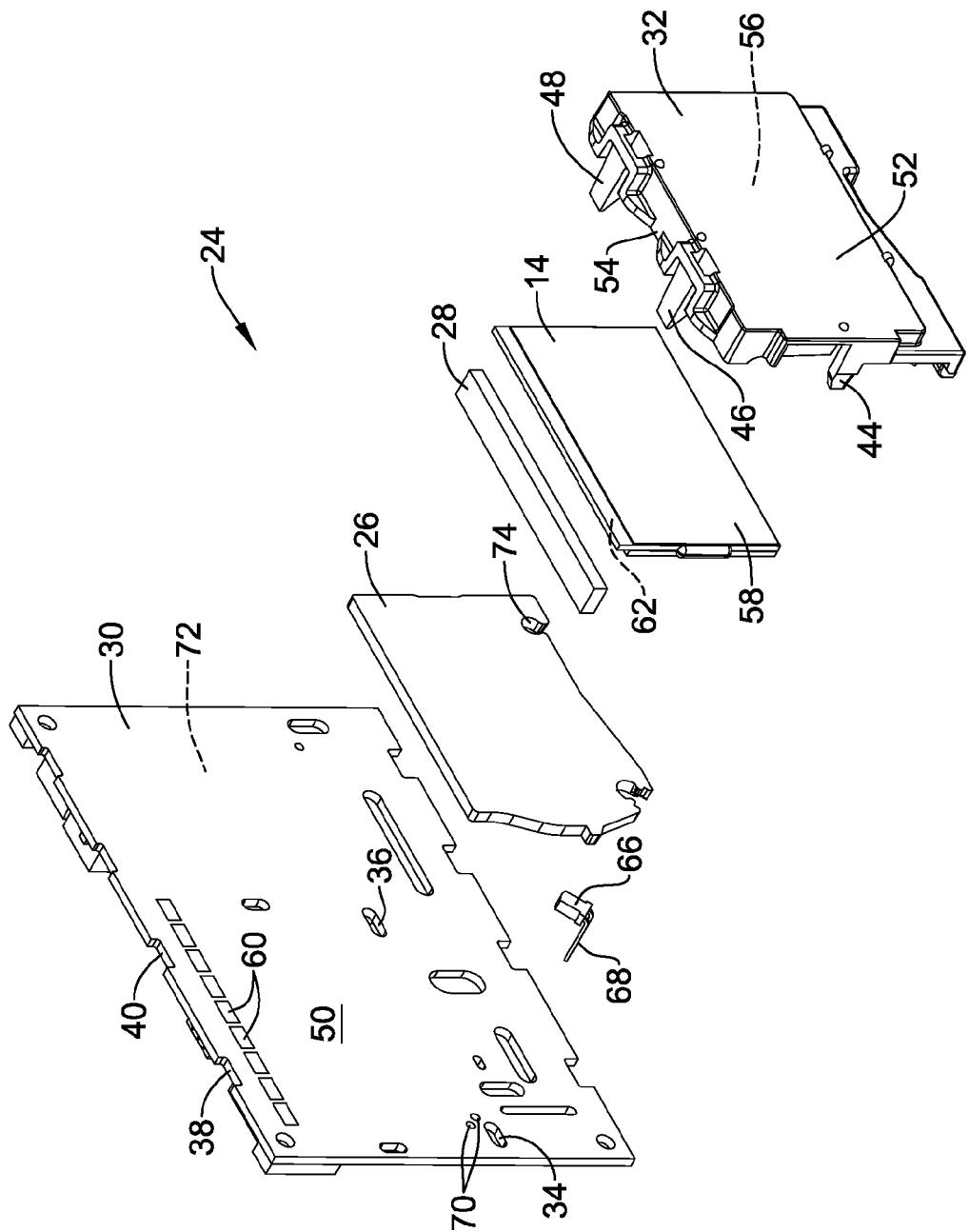
FIG. 2 is a perspective view of an illustrative backlighting assembly for use in illuminating the display panel of FIG. 1.

FIG. 2 is a perspective view showing an illustrative backlight assembly 24 for use in illuminating the display panel 14 of FIG. 1. As shown in FIG. 2, the backlight assembly 24 can include a light emitting panel 26 and elastomeric zebra-strip 28, which along with the display panel 14, can be supported adjacent to a printed circuit board 30 via a display retainer 32. A number of slots 34,36,38,40 disposed within the printed circuit board 30 can each receive a corresponding tab 44,46, 48 on the display retainer 32, allowing the retainer 32 to be releasably secured to a non-component side 50 of the printed circuit board 30. A first set of lower slots 34,36 on the printed circuit board 30, for example, can be configured to mate with and receive a corresponding set of lower tabs 44 projecting outwardly from the display retainer 32. A second set of upper slots 38,40 located along the upper periphery of the printed circuit board 30, in turn, can be configured to mate with and receive a corresponding set of upper tabs 46,48 projecting outwardly from the display retainer 32.

The display retainer 32 can include a front face 52 that projects through an opening within the front side 22 of the appliance housing 12, and a rear face 54 that lies adjacent to the non-component side 50 of the printed circuit board 30, once assembled. An inset portion 56 on the rear face 54 of the display retainer 32 can be configured to support and retain the display panel 14, elastomeric zebra-strip 28, and light emitting panel 26 in a fixed position adjacent to the non-component side 50 of the printed circuit board 30. The display retainer 32 can be constructed from an optically translucent material to permit the front side 58 of the display panel 14 to be viewed through the display retainer 32. Examples of optically translucent materials can include, but are not limited to, polycarbonate, acrylic, styrene acrylonitrile thermoplastic, and acrylonitrile butadiene styrene (ABS).

The elastomeric zebra-strip 28 can be configured to fit within the inset portion 56 of the display retainer 32 and provide electrically connectivity between the display panel 14 and several leads 60 located on the non-component side 50 of the printed circuit board 30. The elastomeric zebra-strip 28 may include several electrically conductive filaments therein that contact the circuit board leads 60 and several leads on the rear side 62 of the display panel 14 when compressed together during assembly.

Backlighting or front-lighting of the display panel 14 can be accomplished using one or more light sources coupled to the printed circuit board 30. In some embodiments, the one or more light source can include point-type light sources such as light emitting diodes (LEDs), which can be mounted adjacent to the non-component side 50 of the printed circuit board 30. In some embodiments, for example, the one or more light sources can include an LED 66 mounted to the non-component side 50 of the printed circuit board 30 for providing light into the light emitting panel 26. The LED 66 can include a number of leads 68 that project through several openings 70 extending through the printed circuit board 30 above a component side 72 of the board 30.

The LED 66 can be configured to emit light rays at one or more wavelengths (i.e. colors) to vary the luminance characteristic of the backlighting. The LED 66 may be a multiple colored LED, or a combination of multiple colored radiation sources (e.g., red, green, blue) in order to provide a desired colored or white light output distribution. In certain embodiments, for example, the LED 66 may include an organic light emitting diode (OLED) capable of emitting light at multiple wavelengths to simulate white-light. While backlighting of the display panel 14 can be accomplished using LEDs, it should be understood that other suitable light sources can be utilized.

To assemble the backlighting assembly 24 to the printed circuit board 30, the display panel 14 and elastomeric zebra-strip 28 can be inserted into the inset portion 56 of the display retainer 32. Once inserted therein, the light emitting panel 26 can then be attached to the display retainer 32 adjacent to the display panel 14 and elastomeric zebra-strip 28, thereby trapping the panel 14 and zebra-strip 28 within the inset portion 56. In certain embodiments, attachment of the light emitting panel 26 to the display retainer 32 can be accomplished with the aid of a notch or groove 74 on the light emitting panel 26, which can be configured to engage a correspondingly shaped post extending outwardly from the rear face 54 of the display retainer 32. For example, attachment of the light emitting panel 26 to the display retainer 32 can be accomplished by inserting the notch or groove 74 over the post, and then rotating the light emitting panel 26 into place adjacent to the display panel 14 and elastomeric zebra-strip 28. Once in place, the backlight assembly 24 can then be attached to the non-component side 50 of the printed circuit board 30 by locking the tabs 44,46,48 into the corresponding slots 34,36, 38,40 on the board 30.

Figure 3:
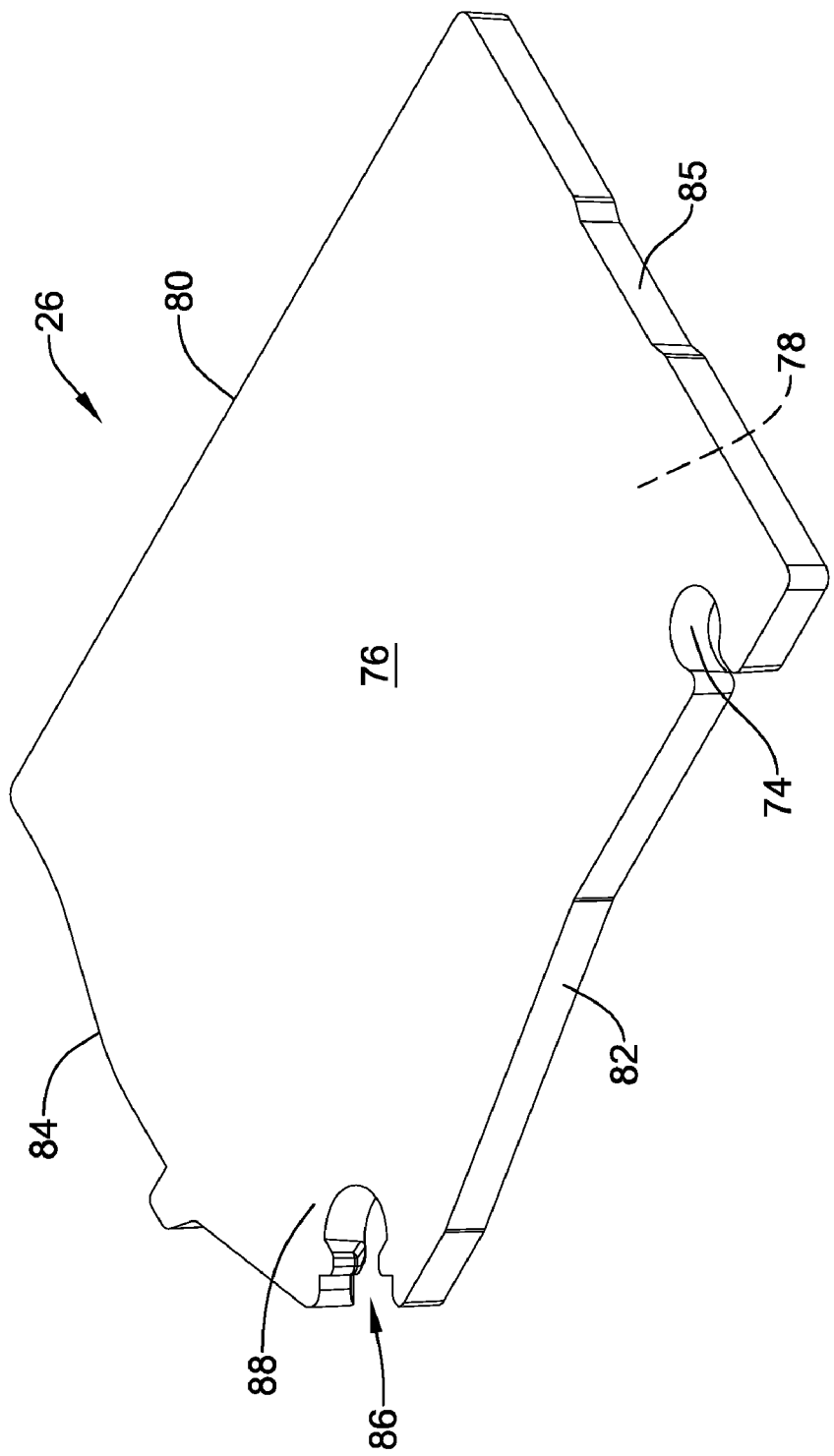
FIG. 3 is a front perspective view of the light emitting panel of FIG. 2.

FIG. 3 is a front perspective view of the light emitting panel 26 of FIG. 2. As shown in FIG. 3, the light emitting panel 26 can include a front emitting face 76, a rear face 78 opposite the emitting face 76, and a number of side edges 80,82,84,85. The emitting face 76 of the light emitting panel 26 can be configured to lie adjacent to and flush with the rear side 62 of the display panel 14. The rear face 78 of the light emitting panel 26, in turn, can be configured to lie adjacent to, and in some cases flush with, the non-component side 50 of the printed circuit board 30. The size and shape of the light emitting panel 26 can correspond generally to the size and shape of the display panel 14 and/or the display retainer 32. In the illustrative embodiment depicted in FIG. 3, the top side edge 80 of the light emitting panel 26 can have a substantially straight configuration, which allows the elastomeric zebra-strip 28 to lie adjacent to and flush with the edge 80 when assembled together.

The light emitting panel 26 may further include a light aperture 86 adapted to receive light directed into the panel 26 from an adjacent light source. A portion 88 of the light emitting panel 26 located at or near the light aperture 86 may form a light guide, which acts as an optical waveguide to direct light rays received from the light source edgewise into the panel 26. The light guide 88 and light emitting panel 26 may be formed of a suitable transparent material such as polycarbonate, acrylic, styrene acrylonitrile thermoplastic, or acrylonitrile butadiene styrene (ABS), which reduces the absorption of light rays as they are passed though the light guide 88 and across the light emitting panel 26.

The light emitting panel 26 may be substantially flat or curved, and can be constructed from a single layer or multiple layers. The dimensions of the light emitting panel 26 can be selected to control the uniformity and brightness of light rays as they are passed across the backside of the display panel 14. In certain embodiments, for example, the thickness of the light emitting panel 26 can be varied to adjust the intensity and/or orientation of light rays reflected towards the backside of the display panel 14 to provide greater or less illumination to particular locations of the display panel 14.

Figure 4:
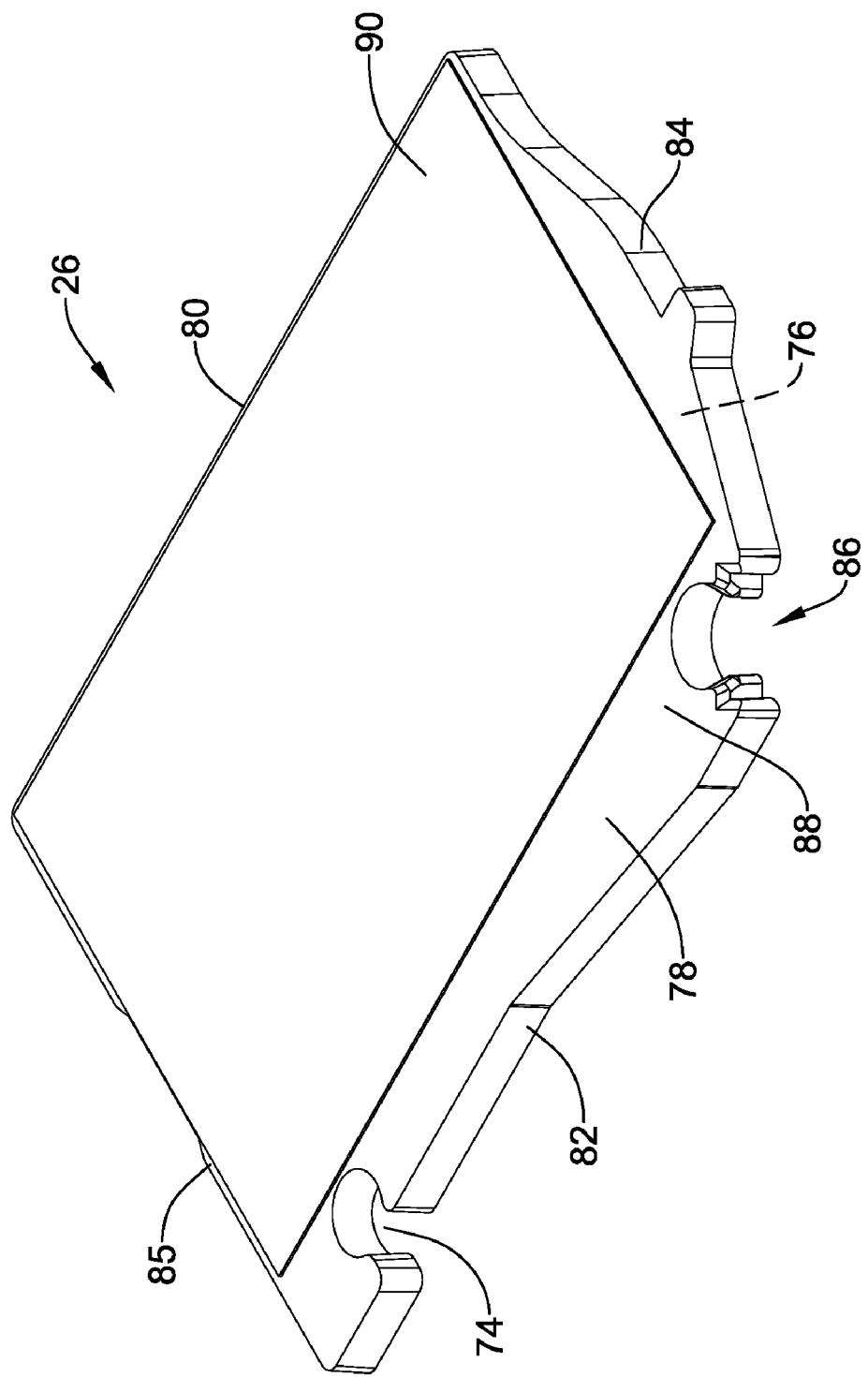
FIG. 4 is a rear perspective view of the light emitting panel of FIG. 2.

FIG. 4 is a rear perspective view of the light emitting panel 26 of FIG. 2. As further shown in FIG. 4, the rear face 78 of the light emitting panel 26 can include a reflective element 90 that directs the light received from the light aperture 86 and light guide 88 in a direction towards the emitting face 76 of the panel 26 for backlighting. The reflective element 90 may include a strip of white reflective tape adhesively mounted to the rear face 78 of the light emitting panel 26. Alternatively, and in other embodiments, the reflector element 90 may include a piece of foil (e.g. aluminum foil) having a specular reflective surface. In one illustrative embodiment, the reflector element 90 may include a white glass-filled material formed integral with the rear face 78 of the light emitting panel 26. Other features such as holes, ridges, channels, dots, squares, etc. may also be provided to vary the light characteristics within the light emitting panel 26, if desired.

Figure 5:
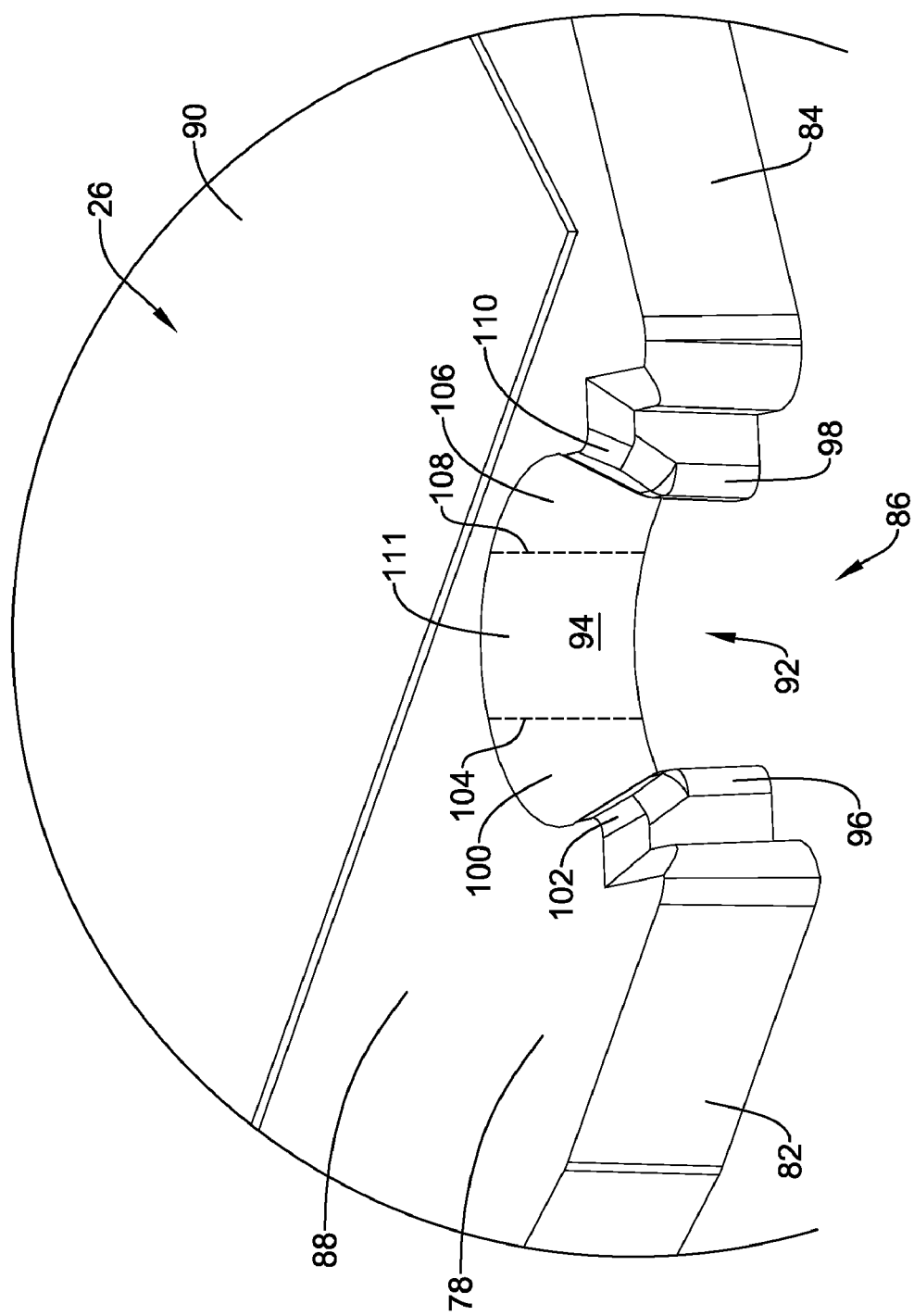
FIG. 5 is an enlarged perspective view of the light aperture in FIG. 4.

FIG. 5 is an enlarged perspective view of the light aperture 86 in FIG. 4. As shown in FIG. 5, the light aperture 86 can include a notch or groove 92 forming a light receiving surface 94 that receives incident light. The notch or groove 92 may have a substantially curved shape which, in conjunction with the light guide 88, facilitates even dispersion of light rays throughout the light emitting panel 26. The size and shape of the notch or groove 92 will typically vary depending on the size, orientation, and configuration of the light source, the size and shape of the light emitting panel 26, as well as other factors. While a semi-circular notch or groove 92 is depicted in FIG. 5, it should be understood that the configuration of the notch or groove 92 may vary from that shown.

The light aperture 86 may further include one or more features to facilitate alignment of the light source relative to the light receiving surface 94. As shown further in FIG. 5, for example, the light aperture 86 may define a number of centering ribs 96,98 extending inwardly into the notch or groove 92. In use, the centering ribs 96,98 can be configured to guide, and in some cases center, the light source within the notch or groove 92 to prevent light from being unevenly dispersed against the surface 94. In certain embodiments, the centering ribs 96,98 may also function as a flange for the light source in order to maintain a non-zero air gap between the light source and surface 94.

In certain embodiments, a portion of the notch or groove 92 may also be beveled to further align the light source relative to the light receiving surface 94. As shown in FIG. 5, for example, the portion of the notch or groove 92 located closest to the rear face 78 of the light emitting panel 26 can be beveled slightly to further align the light source relative to the light receiving surface 94. The beveled section may extend across the entire radius of the light receiving surface 94 between the centering ribs 96,98, or alternatively may extend across only a portion or portions of the light receiving surface 94. In the latter case, for example, the bevel may include a first beveled section 100 extending from a first location 102 on the surface 94 to a second location 104 thereon, as indicated generally by the dashed line. A second beveled section 106, in turn, may extend from a third location 108 on the surface 94 to a fourth location 110 thereon, as further indicated by dashed line. In use, the beveled sections 100,106 help to maintain the alignment and spacing of the light source within the notch or groove 92 without affecting the incident light received on a light sensitive area 111 located between the beveled sections 100,106.

Figure 6:
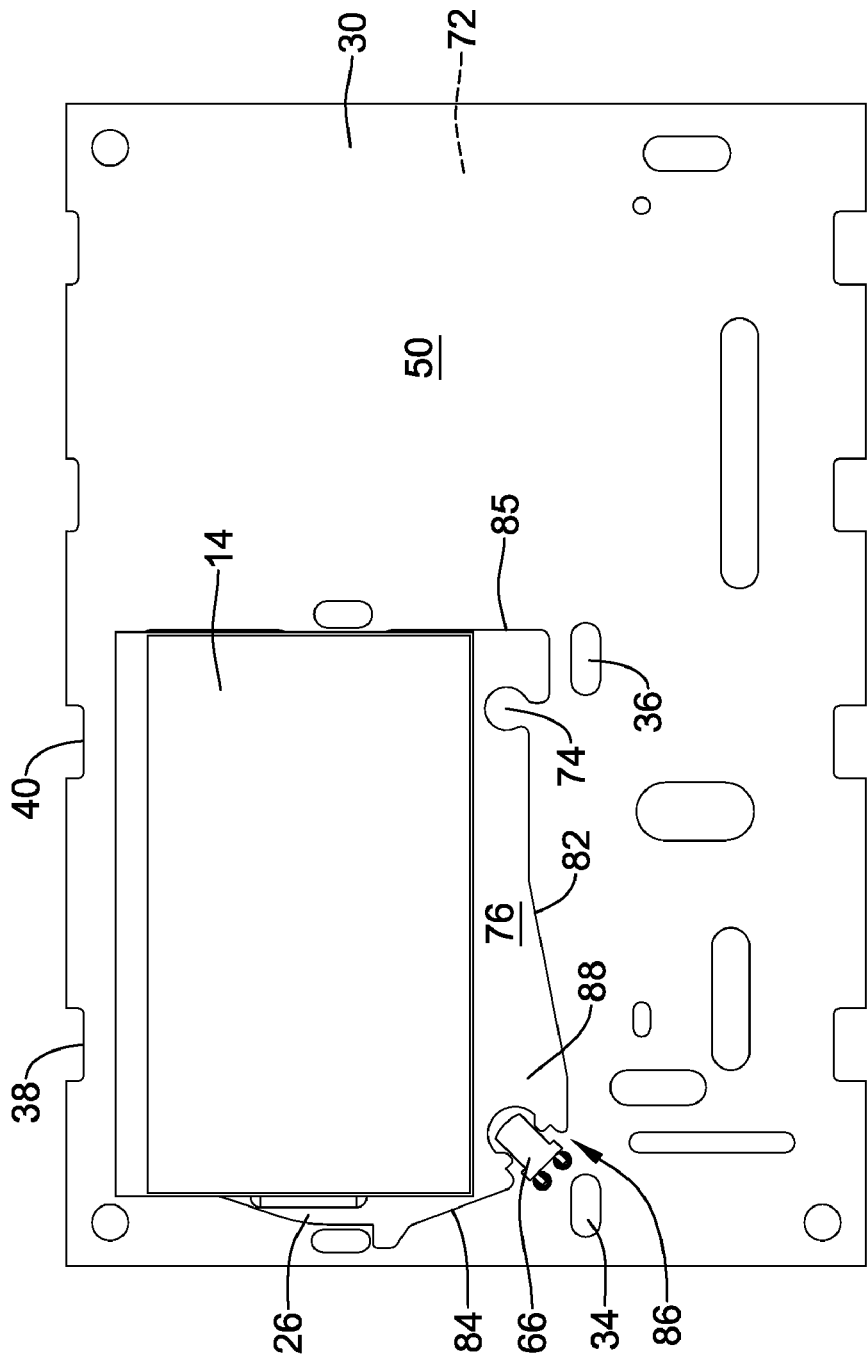
FIG. 6 is a front view showing the light emitting panel and light source attached to the printed circuit board.

FIG. 6 is a front view showing the light emitting panel 26 and LED 66 once assembled to the printed circuit board 30. As can be seen in FIG. 6, with the display retainer 32 and elastomeric zebra-strip 28 removed for purposes of illustration, the light aperture 86 for the light emitting panel 26 can be configured to surround at least a portion of the LED 66. The LED 66 can be assembled to the printed circuit board 30 as a separate element from the light emitting panel 26, and can be configured to direct light edgewise into the panel 26 from a direction substantially parallel and adjacent to the non-component side 50 of the printed circuit board 30, as shown.

Figure 7:
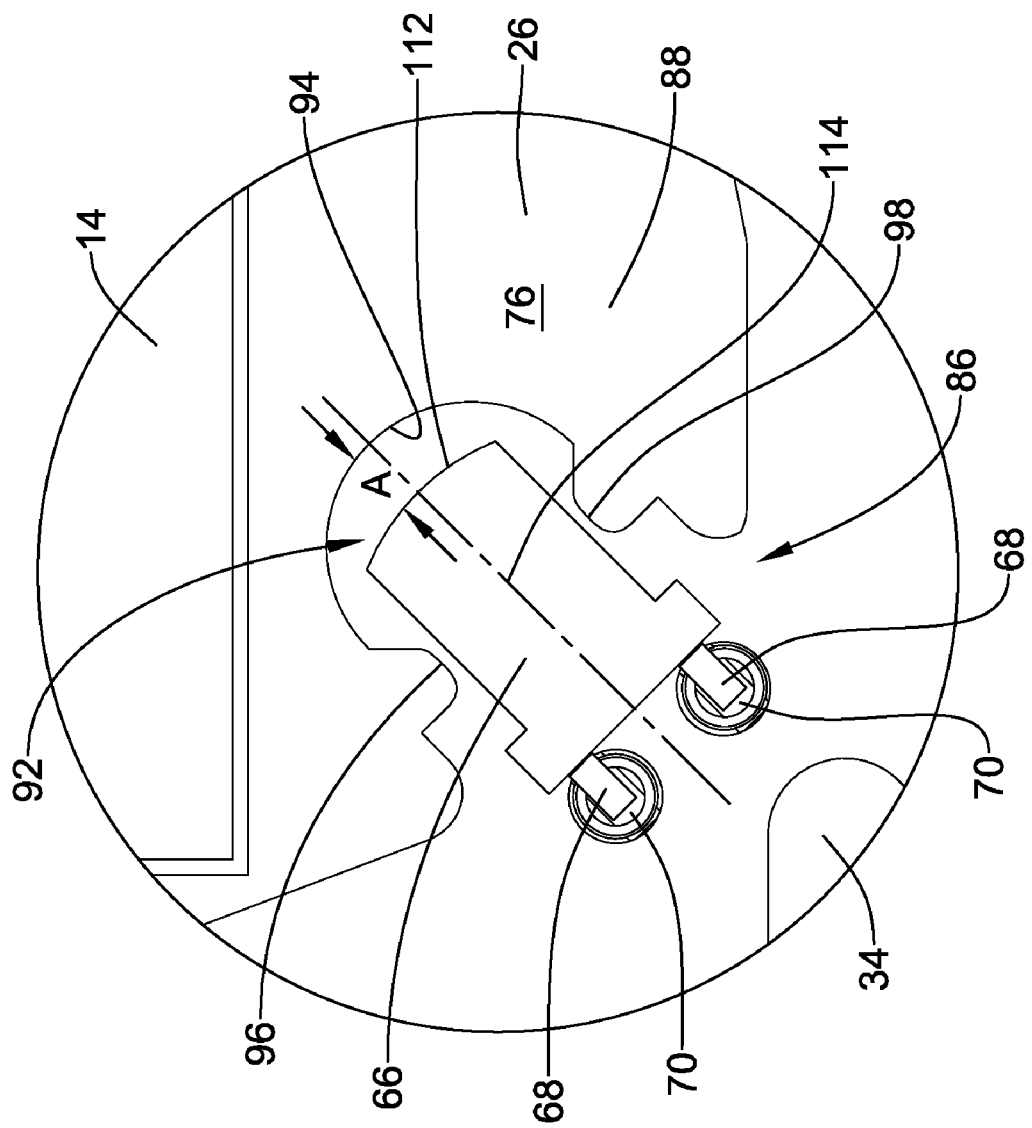
FIG. 7 is an enlarged view showing the light source disposed within the light aperture.

As further shown in an enlarged view in FIG. 7, the size and shape of the notch or groove 92 can be configured to form an air gap A between the light emitting surface 112 of the LED 66 and the light receiving surface 94 of the light emitting panel 26. In certain embodiments, for example, the notch or groove 92 can be dimensioned so as to maintain a uniform air gap A between each point on the light emitting surface 112 and correspondingly adjacent point on the light receiving surface 94. In use, such maintenance of a uniform air gap A between the LED 66 and light emitting panel 26 prevents light from being distributed non-uniformly across the panel 26.

In some embodiments, the centering ribs 96,98 can be configured to center the LED 66 along a centerline 114 of the light receiving surface 94 to prevent the LED 66 from becoming laterally offset within the notch or grove 92. In those embodiments where all or a portion of the notch or groove 92 is beveled, the vertical position of the LED 66 relative to the light receiving surface 94 may be further fixed to prevent the LED 66 from becoming vertically offset within the notch or groove 92. By aligning the LED 66 within the interior of the notch or groove 92 in this manner, visual inconsistencies such as hot spots or streaks that can reduce the brightness and uniformity of the backlighting can be reduced or eliminated.

Figure 8:
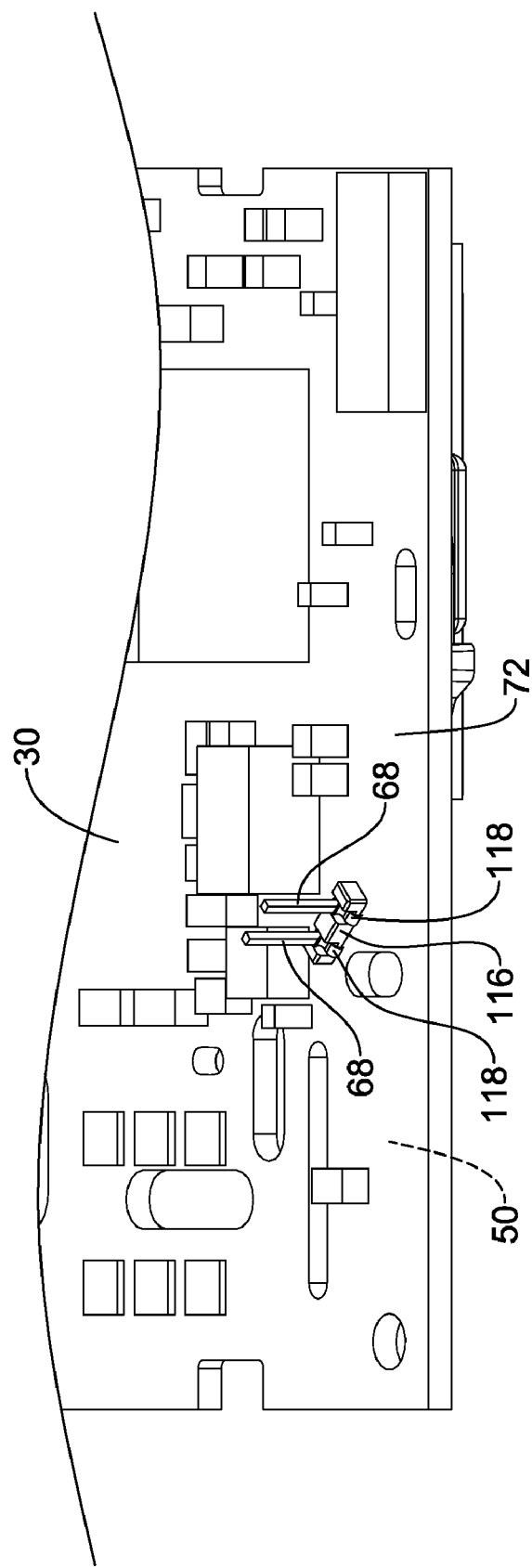
FIG. 8 is an enlarged perspective view showing the attachment of the light source leads to the component side of the printed circuit board.

FIG. 8 is an enlarged perspective view showing the attachment of the LED leads 68 to the component side 72 of the printed circuit board 30. As shown in FIG. 8, the component side 72 of the printed circuit board 30 can include a plug-in connector 116 including a number of openings 118 adapted to receive the leads 68 of the LED 66. The connector 116 can be mounted to the printed circuit board 30 using a suitable mounting process such as surface mounting (SMT), paste-in-hole soldering, or IR reflow soldering. During assembly, the LED leads 68 can be push-fit into the openings 118 with the LED 66 extending above the non-component side 50 of the printed circuit board 30. While the attachment of the LED 66 to the printed circuit board 30 can be accomplished with the aid of a plug-in connector 116, it should be understood that the LED 66 can be attached to the board 30 using other suitable techniques such as IR reflow, wave soldering, paste-in-hole, etc.

Figure 9:
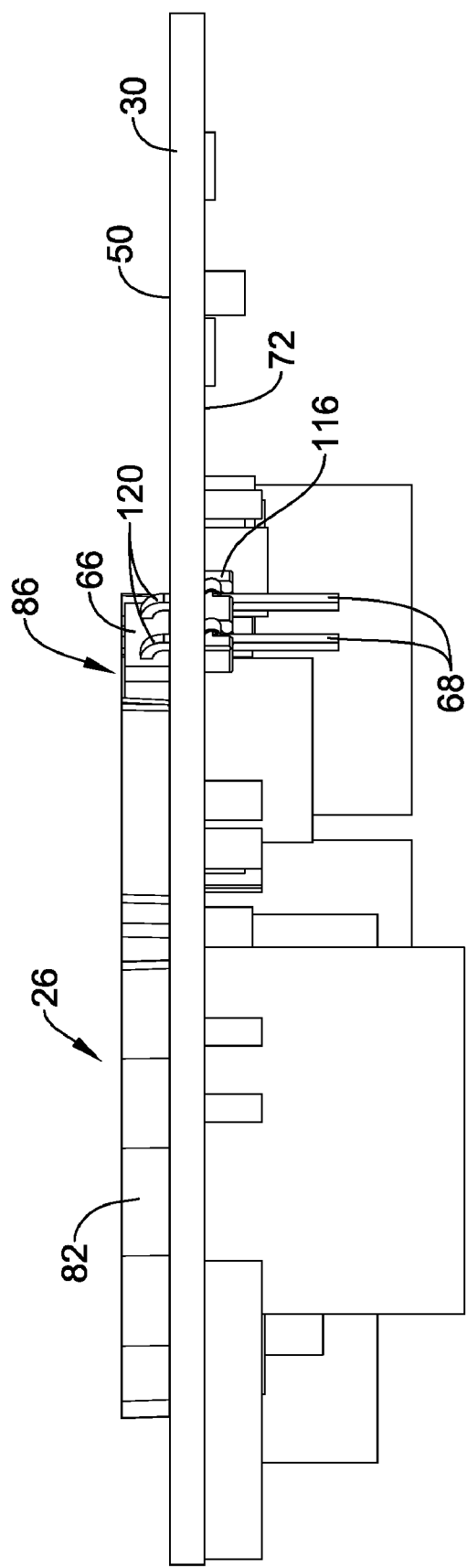
FIG. 9 is a side perspective view showing the attachment of the light emitting panel and light source to the printed circuit board.

FIG. 9 is a side perspective view showing the attachment of the light emitting panel 26 and LED 66 to the printed circuit board 30. As shown attached in FIG. 9, the LED 66 may lie immediately adjacent to and flush with the non-component side 50 of the printed circuit board 30. In such configuration, the LED leads 68 may each include a bend region 120 orienting the LED 66 in a direction substantially parallel with the printed circuit board 30 to direct light edgewise into the light emitting panel 26. Attachment of the LED 66 to the printed circuit board 30 can be accomplished, for example, by inserting the LED leads 68 through the openings 70 in the board 30 and then bending the LED 66 at an angle of approximately 90° or some other desired angle. Alternatively, the LED leads 68 may be pre-bent to permit the LED 66 to be attached to the printed circuit board 30 without the additional bending step. Since the LED 66 is not rigidly attached to the light emitting panel 26, it can be assembled as a separate component from the panel 26, providing greater flexibility to the assembly process over those designs where the light source is embedded, potted, or bonded to the panel.

Figure 10:
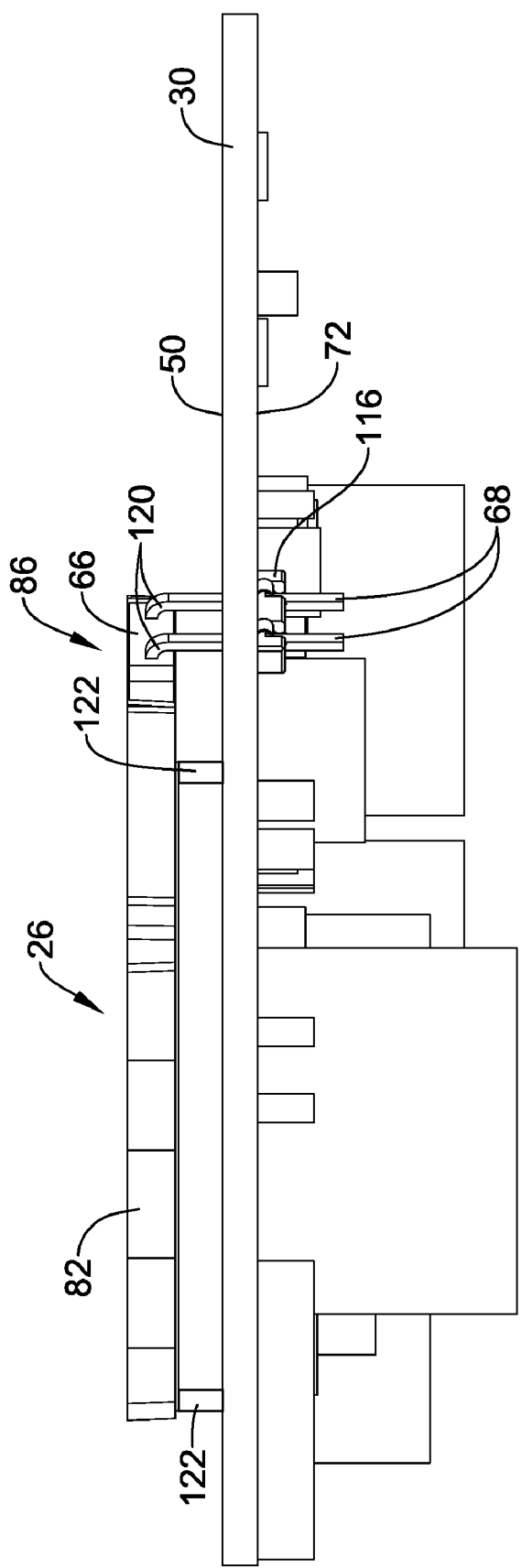
FIG. 10 is a side perspective view of another embodiment wherein the light emitting panel and light source are spaced apart from the printed circuit board.

Although the light emitting panel 26 and LED 66 can be configured to lie flush against the non-component side 50 of the printed circuit board 30, other configurations where the panel 26 and LED 66 are spaced apart from the non-component side 50 of the printed circuit board 30 are also contemplated. In one such embodiment depicted in FIG. 10, for example, the light emitting panel 26 may be spaced apart from the non-component side 50 of the printed circuit board 30 via a number of spacers or risers 122. In this configuration, the LED 66 can be spaced apart from the printed circuit board 30 and oriented so as to direct light rays edgewise into the light interface 86 of the light emitting panel 26.

Figure 11:
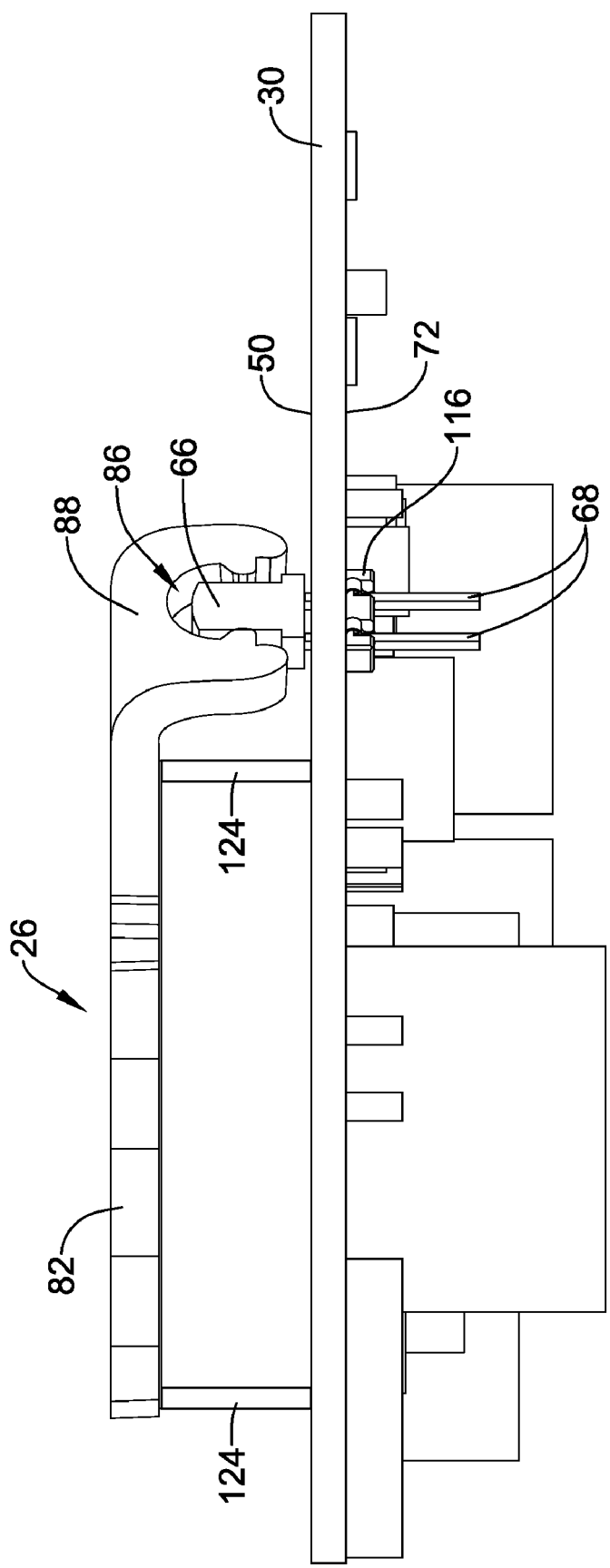
FIG. 11 is a side perspective view of another embodiment wherein the light source is oriented at an angle relative to the light emitting panel.

The light emitting panel 26 can be configured to receive light from any number of different directions to permit the LED 66 to be oriented at an angle relative to the panel 26. In one alternative embodiment depicted in FIG. 11, for example, the light guide 88 of the light emitting panel 26 can be bent or curved to permit the LED 66 to be mounted in a direction substantially perpendicular to the printed circuit board 30, as shown. In some embodiments, the light guide 88 may be formed integrally with the light emitting panel 26. In other embodiments, the light guide 88 may comprise a separate component from the light emitting panel 26 that can be attached to the printed circuit board 30. A number of spacers or risers 124 can be further provided to space the light emitting panel 26 apart from the non-component side 50 of the printed circuit board 30, if desired. In use, the LED 66 can be configured to direct light upwardly into the light interface 86, which is then directed edgewise into the light emitting panel 26 via the light guide 88.

Figure 12:
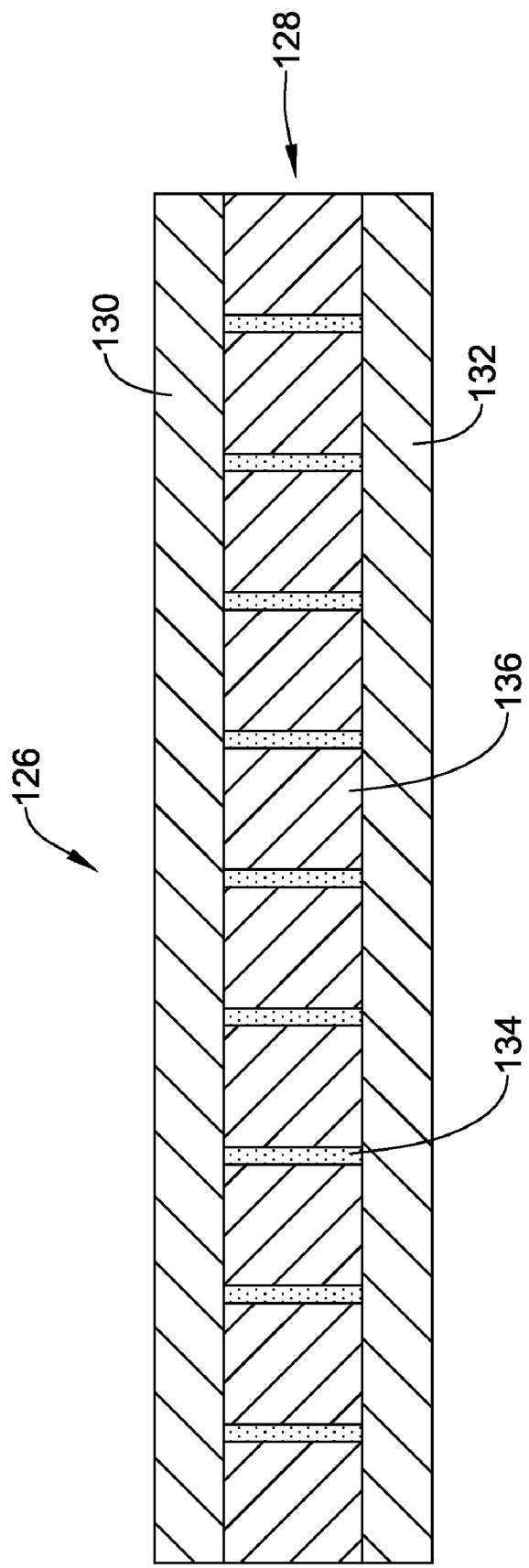
FIG. 12 is a cross-sectional view showing an illustrative zebra-strip for providing electrical conductivity between the display retainer and printed circuit board.

FIG. 12 is a cross-sectional view showing an illustrative zebra-strip 126 for providing electrical connectivity between the display retainer and printed circuit board. As shown in FIG. 12, the zebra-strip can have a stacked or multi-layered configuration including a conductive layer 128 interposed between two layers 130,132 of nonconductive material. The conductive layer 128 can include a number of electrically conductive filaments 134 therein adapted to contact the board leads and display panel leads when compressed. The filaments 134 may be formed, for example, from carbon-doped rubber or other suitably conductive material, and can be spaced apart from each other via a number of nonconductive sections 136.

Figure 13:
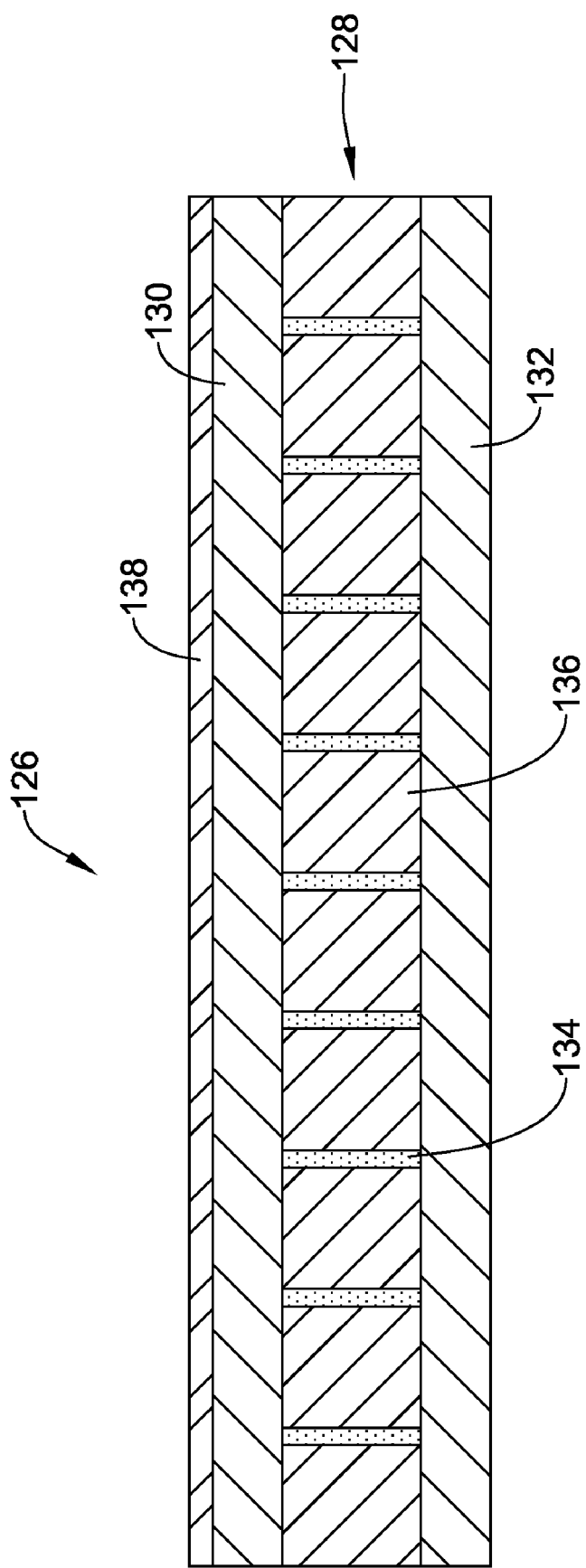
FIG. 13 is a side cross-sectional view showing another illustrative zebra-strip with a reflective element.

The two outer layers 130,132 can be formed from an elastomeric material to permit the filaments 134 within the conductive inner layer 128 to make contact with the display panel and printed circuit board leads. The two outer layers 130,132 can be formed from a white-glossy material, which acts in part as a reflector to prevent light from escaping the edge of the light emitting panel and display panel. In some embodiments, and as further shown in FIG. 13, a reflective element 138 may also be placed on one of the outer layers 130 to further prevent light from escaping the edge of the light emitting panel and display panel. The reflective element 138 can include, for example, a layer or coating of white or colored material which increases the brightness of the backlighting by reflecting light escaping through the edge of the light emitting panel adjacent to the zebra-strip 126. In some embodiments, the reflective element 138 may be used to further improve the uniformity of light output distribution. If desired, a similar reflective element may be placed on other locations of the light emitting panel to further improve the brightness of the backlighting.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A device for providing backlighting or front-lighting to a display panel, the device comprising:
    a light emitting panel having an emitting face, a rear face, and an edge;
    the light emitting panel including at least one light interface for receiving light from a light source spaced apart from the light emitting panel, the light interface defining a light interface aperture that is configured to at least partially receive a portion of the light source therein;
    the light interface aperture defining a semi-circular notch or groove; and
    at least one guiding member for aligning the light source within the light interface aperture, said at least one guiding member including one or more ribs extending inwardly within the semi-circular notch or groove.

2. The device of claim 1, wherein the light emitting panel includes a light guide configured to receive incident light from a light receiving surface of the light interface aperture.

3. The device of claim 2, wherein the light guide includes a curved or bent section.

4. The device of claim 1, wherein the light interface aperture is configured to at least partially surround the light source.

5. The device of claim 1, wherein the light interface aperture is dimensioned to maintain an air gap between a light receiving surface of the light interface aperture and a light emitting surface of the light source.

6. The device of claim 1, wherein said at least one guiding member includes a beveled section of the semi-circular notch or groove located on the rear face of the light emitting panel.

7. The device of claim 6, wherein the beveled section includes a plurality of beveled sections.

8. The device of claim 1, further comprising a reflective element coupled to the rear face of the light emitting panel.

9. A backlight assembly mountable to a circuit board having a component side and a non-component side, the backlight assembly comprising:
    a display panel;
    at least one light source coupled to the circuit board; and
    a light emitting panel having an emitting face, a rear face opposite the emitting face, and an edge, the light emitting panel including a light aperture adapted to form an air gap between the at least one light source and a light receiving surface of the light emitting panel;

wherein the light aperture includes a number of inwardly extending ribs adapted to align the at least one light source within the aperture.

10. The backlight assembly of claim 9, wherein the light source is detached from the light emitting panel.

11. The backlight assembly of claim 9, wherein the light emitting panel includes a light guide adapted to receive light from the light receiving surface of the light emitting panel.

12. The backlight assembly of claim 11, wherein the light guide includes a curved or bent section.

13. The backlight assembly of claim 9, wherein the light aperture is adapted to at least partially surround the light source.

14. The backlight assembly of claim 9, wherein the light aperture includes a semi-circular notch or groove.

15. The backlight assembly of claim 14, wherein the semi-circular notch or groove includes at least one beveled section located on the rear face of the light emitting panel.

16. The backlight assembly of claim 9, further comprising a reflective element coupled to the rear face of the light emitting panel.

17. The backlight assembly of claim 9, wherein the rear face of the light emitting panel is adapted to lie adjacent to the non-component side of the circuit board.

18. The backlight assembly of claim 9, wherein the rear face of the light emitting panel is adapted to lie adjacent to and flush with the non-component side of the circuit board.

19. The backlighting assembly of claim 9, wherein said at least one light source includes a light emitting diode.

20. The backlight assembly of claim 19, wherein the leads of the light emitting diode are coupled to the component side of the printed circuit board using a plug-in connector.

21. The backlight assembly of claim 9, further comprising a conductive member electrically coupling the display panel to the circuit board.

22. The backlight assembly of claim 21, wherein the conductive member includes an elastomeric zebra-strip having a reflective element.

23. The backlight assembly of claim 21, further comprising a display retainer adapted to support the display panel, conductive member, and light emitting panel adjacent to the non-component side of the circuit board.

24. A method for attaching a backlight assembly to a circuit board having a component side and a non-component side, the method comprising the steps of:
   attaching at least one light source to the circuit board;
   providing a backlight assembly including a display panel, a light emitting panel including a light interface, and display retainer, the light interface defining an aperture having at least one guiding member therein, the at least one guiding member including a number of ribs extending inwardly within the aperture;
   assembling the display panel and light emitting panel within the display retainer; and
   securing the assembled display retainer to the circuit board;
   wherein, during said step of securing the assembled display retainer to the circuit board, the at least one guiding member is adapted to align the light source within the aperture forming an air gap between the light source and interface.

25. The method of claim 24, wherein the display retainer includes a number of locking tabs, and wherein said step of securing the assembled display retainer to the circuit board includes the step of securing the locking tabs into a number of slots on the circuit board.

26. The method of claim 24, wherein said at least one guiding member includes a beveled section of the aperture.

27. A method for attaching a backlight assembly to a circuit board having a component side and a non-component side, the method comprising the steps of:
   attaching at least one light source to the circuit board including the steps of:
      mounting a plug-in connector to the component side of the circuit board; and
      inserting a number of leads of the light source through several openings formed through the circuit board and plug-in connector with the light source positioned adjacent to the non-component side of the circuit board;
   providing a backlight assembly including a display panel, a light emitting panel including a light interface, and display retainer, the light interface defining an aperture having at least one guiding member therein;
   assembling the display panel and light emitting panel within the display retainer; and
   securing the assembled display retainer to the circuit board;
   wherein, during said step of securing the assembled display retainer to the circuit board, the at least one guiding member is adapted to align the light source within the aperture forming an air gap between the light source and interface.

* * * * *